United States Patent [19]
Csendes

[11] Patent Number: 5,850,977
[45] Date of Patent: Dec. 22, 1998

[54] METHOD AND APPARATUS FOR COMMINUTING SOLID PARTICLES

[76] Inventor: Ernest Csendes, 514 Marquette St., Pacific Palisades, Calif. 90272

[21] Appl. No.: 984,312

[22] Filed: Dec. 3, 1997

Related U.S. Application Data

[63] Continuation-in-part of Ser. No. 423,326, Apr. 17, 1995, Pat. No. 5,695,130.

[51] Int. Cl.⁶ .............................. B02C 19/12; B02C 23/24
[52] U.S. Cl. ........................... 241/17; 241/19; 241/24.31; 241/48; 241/52; 241/56; 241/65; 241/79.1; 241/162
[58] Field of Search ............................ 241/17, 19, 24.31, 241/48, 52, 56, 65, 79.1, 79.3, 78, 154, 161, 162

[56] References Cited

U.S. PATENT DOCUMENTS

| | | | |
|---|---|---|---|
| 293,047 | 2/1884 | Mackey | 241/162 X |
| 911,913 | 2/1909 | Snyder et al. | 241/162 X |
| 1,524,651 | 2/1925 | Hapgood | 241/162 X |
| 2,713,977 | 7/1955 | Noll . | |
| 2,752,097 | 6/1956 | Lecher . | |
| 3,506,201 | 4/1970 | Engels et al. | 241/78 X |
| 3,690,571 | 9/1972 | Luthi et al. | 241/79.3 X |
| 3,837,483 | 9/1974 | Noll . | |
| 4,690,338 | 9/1987 | Sayler et al. | 241/56 |
| 4,747,550 | 5/1988 | Jackering | 241/55 |
| 5,280,857 | 1/1994 | Reichner . | |
| 5,695,130 | 12/1997 | Csendes | 241/19 |

*Primary Examiner*—John M. Husar
*Attorney, Agent, or Firm*—Edward A. Sokolski

[57] ABSTRACT

A cylindrical vessel has a drive shaft rotatably mounted therein and extending along substantially the entire longitudinal extent thereof. This drive shaft is rotatably driven by a motor at a speed of 1,500–10,000. Solid particles to be comminuted which may be of coal and limestone/dolomite or lime are fed into the vessel. Connected to the shaft and rotatably driven therewith is a centrifugal compressor fan which forms an uplifting air curtain which suspends the particles. Mounted above the compressor and rotatably driven by the drive shaft are a plurality of rotors, screens, and a disc mounted in an aperture formed in a fixed plate which forms a circular vortex in the space between the disc and the plate. The particles are comminuted by the successive action of the rotors, screens and the circular vortex, larger particles being repelled for further comminution while the finer particles are fed from the vessel to cyclonic classifiers. The fully comminuted particles are removed for utilization while the gas which carried the particles is first cooled to liquidize moisture which is removed therefrom and then recycled to the vessel.

12 Claims, 4 Drawing Sheets

METHOD AND APPARATUS FOR COMMINUTING SOLID PARTICLES

BACKGROUND OF THE INVENTION

This application is a continuation in part of my application Ser. No. 08/423,326 filed Apr. 17, 1995 for a Method and Apparatus for Dry Grinding of Solids now U.S. Pat. No. 5,695,130.

1. Field of the Invention

This invention relates to a method and apparatus for comminuting solid particles and more particularly to such a method and apparatus which both converts such particles to microparticulates and removes moisture therefrom.

2. Description of the Related Art

Micronized coal is used extensively as an energy source in the generation of electricity and micronized limestone/dolomite or lime is extensively used for environmental compliance in the flue gas cleanups of power plants. Micronized coal burns with a flame velocity similar to natural gas or fuel oil and with a short flame that allows the heat energy generated in the combustion to be readily transferred to the water walls of the boiler. This results in an increased boiler rating and less heat losses through the ducts and flue stack. In addition to providing a more complete combustion, the micronized coal yields upon combustion a micronized fly ash with low carbon content which is of considerable value in the construction industry as a substitute for cement in high strength concrete formulations.

In addition the combustion of micronized coal requires no excess air and results in minimized NOx in the flue gases. Micronized limestone, dolomite or hydrated lime are most valuable in the dry hot scrubbing of flue gases and affords a more effective aqueous scrubbing thereof as they have much larger reactive surfaces for the SOx and NOx scrubbing. This results in a more complete utilization of the sorbents resulting in substantial savings in the flue gas clean up section of a power plant in conforming to the requirements of the Clean Air Act.

The use of micronized coal and limestone/dolomite or lime as the fuel for generating electric power thus has significant advantages over the use of conventional fuels such as natural gas, fuel oil or non-micronized coal.

In my application Ser. No. 08/423,326 now U.S. Pat. No. 5,695,130 of which the present application is a continuation in part, a grinding system is described in which rotating screens with wide mesh openings are first used to comminute the material through spiral vortexes and such comminuted material is then fed to circular vortexes formed between rotating discs and stationary plates where the final grinding of the particulate material is accomplished and the final comminuted material is separated from the gas streams by centrifugal fans. The system and method of the present invention applies the basic technology of my prior art patent application in implementing the micronization of solid particles such as coal and limestone/dolomite and lime.

SUMMARY OF THE INVENTION

The device and method of the present invention involves the employment of a series of high speed rotating screens to form vertical spiral vortexes for comminuting particulate material in conjunction with a series of high speed rotating discs which are located in circular apertures in stationary plates. The particles being comminuted are propelled upwardly by means of a centrifugal compressor fan.

In implementing the above indicated operation, an air tight cylindrical vessel filled with an inert gas such as nitrogen and having inlets near the bottom and center thereof and outlets near the top has a drive shaft running from the bottom to the top. The drive shaft is driven at high speeds (1,500–10,000 rpm) by means of a drive motor. The solid particles to be comminuted are fed into an inlet near the center of the vessel and driven by a centrifugal compressor fan connected to the drive shaft so that such particles are floated in suspension on the air curtain thus provided. Rotors, driven by the drive shaft provide perpendicular centrifugal force which drives the particles to the side walls of the vessel where they form a fluid bed suspended on the gas curtain formed. The inner wall of the vessel has a rubber liner and is segmented by vertically positioned flow enhancer bars by means of which pockets of particles are formed that are comminuted by the agitation of the fast moving rotors and the flow pressure differentials arising out of the differences in the flow pressures between the pockets and the apices of the flow enhancer bars.

As the particles in the pockets decrease in size, the centrifugal forces have less effect on them and such particles move towards the center of the vessel. The uplift forces generated in the vessel carry these particles upwardly into a rotating screen being driven by the drive shaft at high speed. The faster moving smaller particles are passed through the screen while the slower moving larger particles are scrubbed and repulsed back to the fluid bed for regrinding.

The smaller particles passed through the screen are exposed to powerful spiral cyclones formed above the screen where an enhanced air erosion further grinds these particles. Such particles next encounter expelling forces generated by louvers which are rotatably driven by the shaft. Larger particles are rejected by the blades of the louvers and fall back into the fluid bed for additional comminution. The smaller particles are next passed into a circular space formed between a disc rotatably driven by the drive shaft and a stationary disc, a horizontal circular vortex being formed in this space which further comminutes the particles. The finer comminuted particles are expelled from the vessel. Particles requiring additional comminution are passed through a second circular vortex formed in the same manner as the first and through a second rotating screen and then expelled from the vessel.

The particles expelled from the vessel are fed to a cyclonic classifier where the micronized particles are recovered. The gases which carried the particles are recycled back to the vessel and en route are cooled so as to liquefy any moisture therein, this liquid being separated out from the gas.

It is therefore an object of this invention to provide micronized particulate fuel which can more efficiently and more economically be utilized in generating power.

It is a further object of this invention to provide a fuel for use in generating power the use of which has environmental advantages.

Other objects of the invention will become apparent in view of the following description taken in connection with the accompanying drawings.

DETAILED DESCRIPTION OF THE INVENTION

Figure 1:
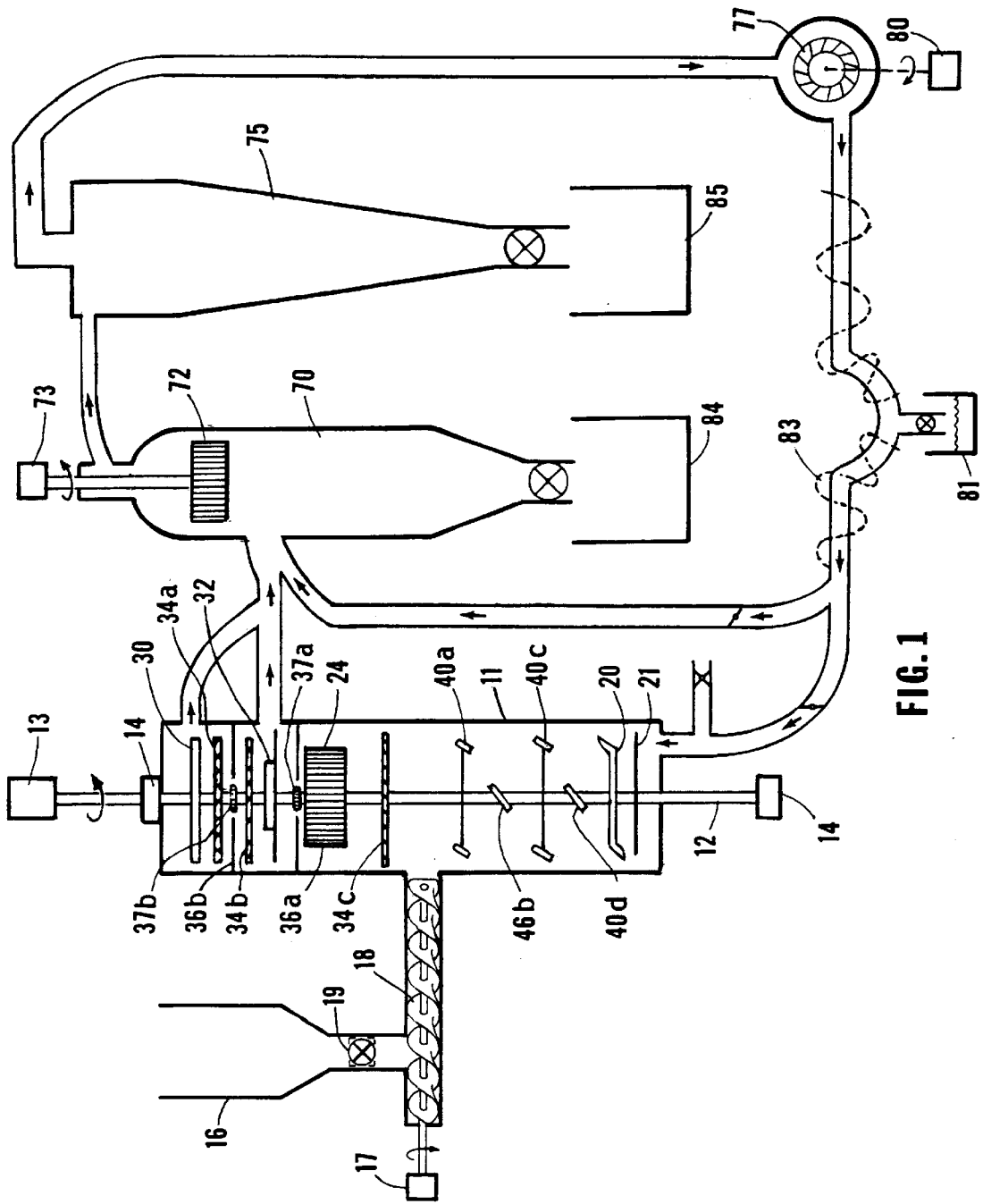
FIG. 1 is a schematic drawings illustrating a preferred embodiment of the invention.

Referring now to FIGS. 1 and 4–13, a preferred embodiment of the invention is illustrated.

Vessel 11 is maintained in an air tight condition and has an inert gas such as nitrogen therein under a pressure of 5–15" of water column. The walls of the vessel are lined with a material such as rubber or neoprene. Drive shaft 12 is mounted for rotation within the vessel on bearings 14 and is rotatably driven by motor 13 at a speed of 3000–4000 rpm.

Attached to shaft 12 for rotation therewith are rotating plate 21, centrifugal compressor fan 20, rotors 40a–40c, semipermeable screens 34a–34c, louvers 24, rotating discs 37a and 37b, and centrifugal eliminating fans 30 and 32.

Coal or limestone particles on the order of ¼" in diameter which may have a surface moisture content of 2–10% are fed from feed hopper 16 into vessel 11 by means of screw feeder 18 which is rotatably driven by motor 17. A rotary lock 19 is provided at the outlet of hopper 16 for use in controlling the flow therefrom.

Centrifugal compressor fan 20 provides an upwardly lifting curtain of gas which suspends the particles fed into the vessel. Rotors 40a–40d provide centrifugal force which drives the particles to the inner wall of the vessel where they form a fluid bed which is kept afloat by the uplifting force provided by centrifugal compressor fan 20.

The inner wall of vessel 11 is segmented by vertical flow enhancer bars 45(See FIG. 8) through which pockets of particles are formed, these particles being comminuted by the agitation provided by the fast moving rotors 40a–40d and the pressure differentials arising out of the flow pressure differences between these pockets and the apices of the flow enhancers. The fast moving rotors generate a centrifugal gravity force of the order of 3000 g–4000 g.

Figure 4:
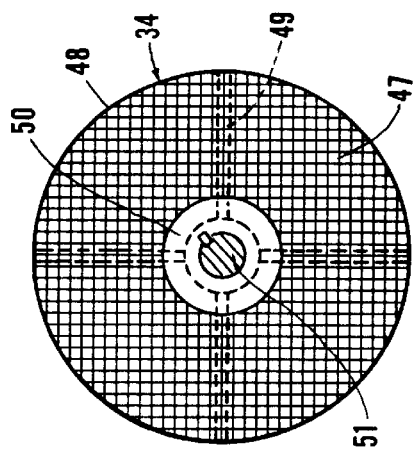
FIG. 4 is a top plan view of one of the semipermeable screens used in the preferred embodiment.
Figure 5:
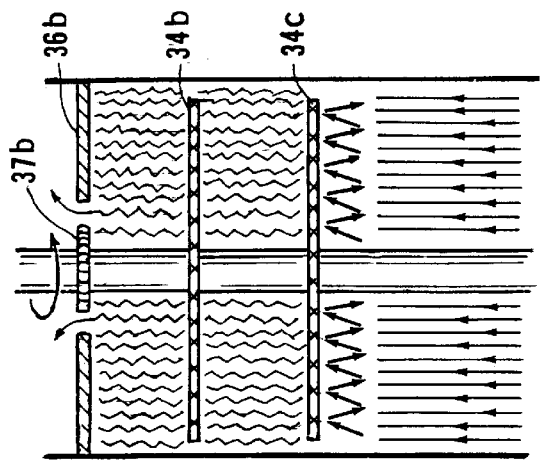
FIG. 5 is a schematic view illustrating the operation of the preferred embodiment.

As the particles in the pockets decrease in size, the centrifugal forces affecting them diminish and such smaller particles move towards the center of the vessel and the helical uplift provided by the rotors carries these smaller particles upwardly. These upwardly moving particles strike against semipermeable means in the form of high speed rotating screen member 34c. This screen is shown in FIG. 4 and in the preferred embodiment is formed by an abrasion resistant steel screen 47 having mesh openings of 4–10 mesh. The screen element is supported in holder ring 48 and reinforced by radial reinforcing rods 49. The center of the screen member has a deflector disc 50 and a central hub 51 with a keyway for connection to the drive shaft 12. The screen member 34c repulses and scrubs the slower moving particles as shown in FIG. 5., returning them to the fluid bed for further grinding.

Figure 7:
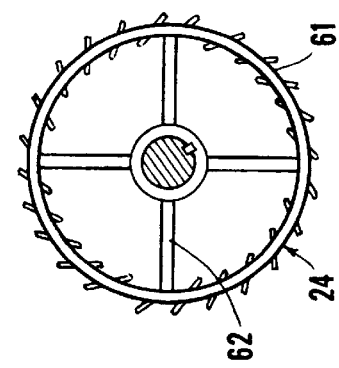
FIG. 7 is a top plan view of the rotating louver of FIG. 6.
Figure 9:
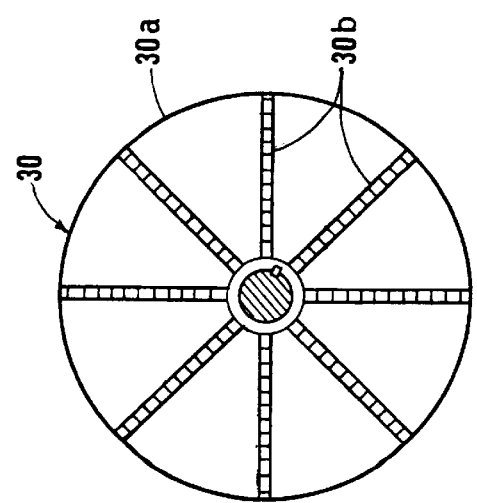
FIG. 9 is a top plan view of one of the centrifugal expelling fans of the preferred embodiment.
Figure 6:
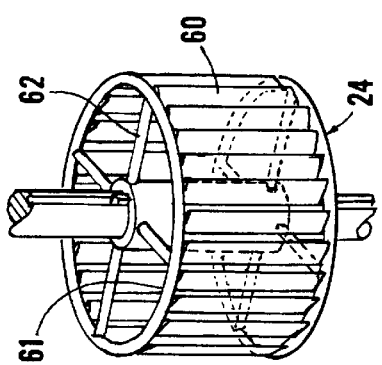
FIG. 6 is a schematic view in perspective illustrating the rotating louver of the preferred embodiment.
Figure 11:
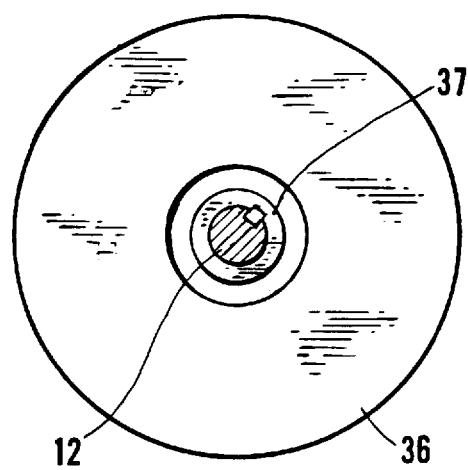
FIG. 11 is a top plan view of the vortex grinding mechanism of the preferred embodiment.
Figure 12:
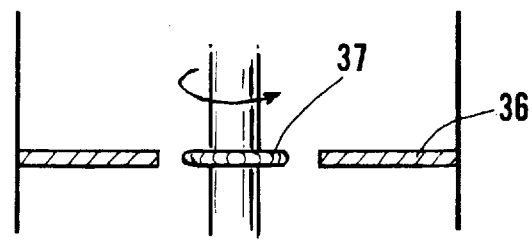
FIG. 12 is a side elevational view of the vortex grinding mechanism of FIG. 11.
Figure 13:
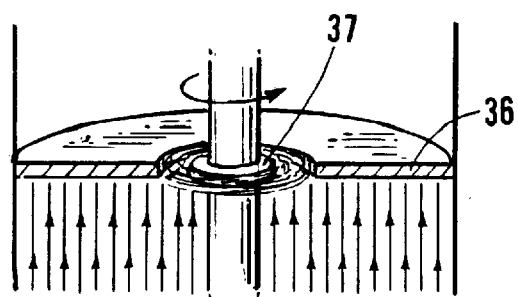
FIG. 13 is a schematic view illustrating the operation of the vortex grinding mechanism of FIG. 11.

The smaller particles pass through screen member 34c and encounter the rotating louvers 24 which can best be seen in FIGS. 6 and 7. The larger particles are driven back by the louver expelling blades 60 and fall back into the fluid bed for further comminution. Louvers 24 are formed with a holder ring 61 and radial reinforcing rods 62 to provide structural support for blades 60.

The smaller particles pass through the louver and next encounter horizontal circular vortexes generated in the circular aperture formed between rotating disc 37a and stationary plate 36a which provides high shearing action. This can best be seen in FIGS. 11–13.

Expelling fans 30 and 32 expel the comminuted particles from the vessel to cyclone classifier 70. Fan 30 has a cover disc 30a and vertical vanes 30b while fan 32 has a cover disc 32a and vertical vanes 32b. For the particles not fine enough to be expelled by fan 32, additional comminuting before expulsion by fan 30 is provided in the vortex zone created in the space between rotating disc 37b and stationary plate 36b, in the same manner as for disc 37a and plate 36a. Also additional communition is provided by rotating screens 34a and 34b which are the same as screen 34c.

The cyclonic classifier consists of two cyclones 70 and 75. Cyclone 70 regulates the fraction cuts through adjustment of the speed of its rotating louver 72 which is driven by motor 73. The blades of the louver are set a predetermined optimum angle for most efficient expulsion of the particles to cyclone 70. The cyclones operate to separate the microparticles from the gas stream as described in my application Ser. No. 08/423,326 of which the present application is a continuation in part. Cyclone 70 regulates the fraction cuts through the adjustment of its louvers 72. Compressor fan 77, is rotatably driven by motor 80, this fan driving any particles remaining in the gas back to cyclone 70. Compressor fan 77 also drives the gas back to vessel 11. This gas is chilled en route to the vessel by means of cooling coil 83 to liquefy any moisture in the gas, this liquid being collected in container 81. The micronized product is collected in containers 84 and 85 at the bottom of cyclones 70 and 75 respectively with a coarser fraction in container 84 and a finer fraction in container 85. Rotary locks 87 and 88 are provided in the cyclones to control the passage of the micronized particles therefrom.

By operating the system in a closed loop and removing moisture from the gas recycled to the grinder, the product collected in the cyclones 70 and 75 has a very low moisture content and emission of microparticulate matter to the outside environment is avoided. This is particularly important in the comminution of the low sulfur younger age coals which have a high internal or constitutional moisture content (e.g. Powder River Coal with an internal moisture content of about 30% by weight) which is liberated during the comminution thereof. This is in addition to the "run-of-the-mine" surface moisture of 6–12%. The drying of the micronized coal substantially increases the heating value of this fuel.

Figure 2:
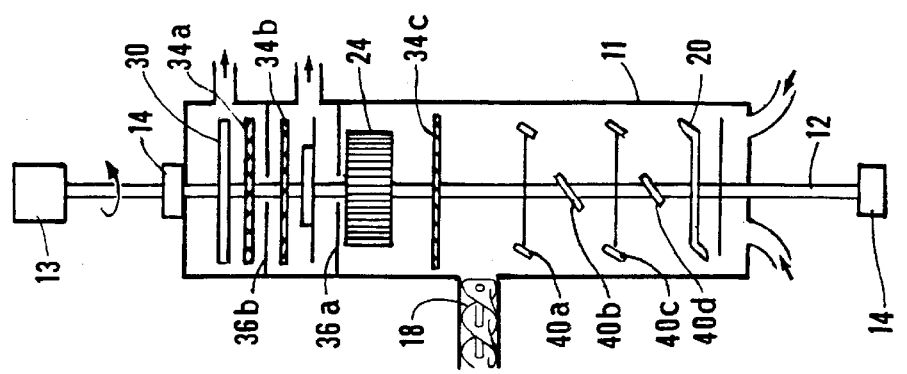
FIG. 2 is a schematic drawing illustrating a second embodiment of the invention.
Figure 8:
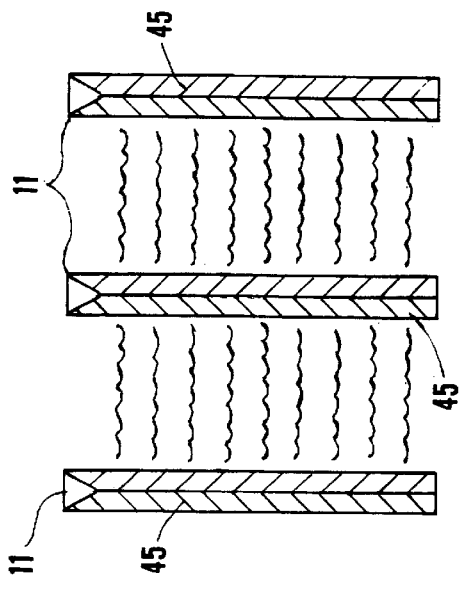
FIG. 8 is a schematic view illustrating the fluid bed grinding in the preferred embodiment.
Figure 10:
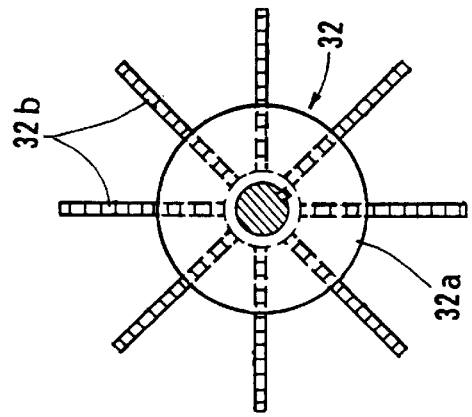
FIG. 10 is a top plan view of a second centrifugal expelling fan of the preferred embodiment.

Referring to FIG. 2, a second embodiment of the invention is illustrated. This embodiment is the same as the first except that the spinning discs 37a and 37b are eliminated and rotating screens 34a–34c are used alone for the superfine grinding. Rotating louvers 24 are relied on in this embodiment for additional recycling of oversized particles to the fluid bed.

Figure 3:
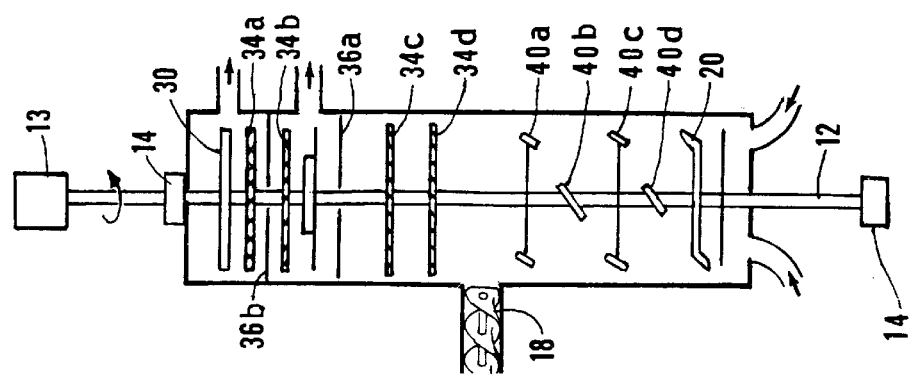
FIG. 3 is a schematic drawing illustrating a third embodiment of the invention.

Referring now to FIG. 3, a further embodiment of the invention is illustrated. In this embodiment, as for that of FIG. 2 the spinning discs 37a and 37b are eliminated and four screens 34a–34d are relied on for superfine grinding and for internal recycling of oversized particle. In addition, in this embodiment the louvers 24 are not employed.

While the invention has been described and illustrated in detail, it is to be clearly understood that this is intended by way of illustration and example only and not by way of limitation, the scope of the invention being only by the terms of the following claims.

I claim:

1. A device for comminuting solid particles to produce microparticles and drying said particles comprising:

a vessel:
  means for feeding said solid particles into said vessel;
  centrifugal compression fan means mounted for rotation in said vessel for forming an uplifting gas curtain for suspending said particles;
  means for comminuting said particles mounted for rotation in said vessel;
  means for rotatably driving said compression fan means and said comminuting means;
  cyclonic classifier means for collecting the comminuted particles,
  means in said vessel for driving said comminuted particles into said cyclonic classifier means, and
  means for recycling gas in said classifier means back to said vessel,
  said recycling means including means for converting moisture therein to liquid and means for removing said liquid from said recycling means.

2. The device of claim 1 wherein said comminuting means comprises a plate fixedly mounted on the wall of said vessel having a circular aperture formed therein and a circular disc mounted in said aperture with a space being formed between said disc and said plate, said disc being rotated at high speed to form a circular vortex zone in said space in which said particles are comminuted.

3. The device of claim 2 wherein said disc is rotated at 1,200–10,000 rpm.

4. The device of claim 1 wherein said comminuting means comprises a plurality of high speed rotating screens by which the particles are comminuted.

5. The device of claim 4 wherein said screens are rotated at 1,200–10,000 rpm.

6. The device of claim 1 wherein said means for feeding the particles into said vessel comprises a screw feeder.

7. A device for comminuting solid particles to produce microparticles and drying said particles comprising:

a cylindrical vessel having outlets near the upper end thereof;
 means for feeding said particles into said vessel;
 a drive shaft rotatably mounted in said vessel;
 means for rotatably driving said drive shaft;
 a plurality of screens connected to said drive shaft for rotation therewith, said screens being spaced from each other in opposing relationship;
 a compressor fan connected to said shaft for rotation therewith, said compressor fan being positioned in said vessel to drive the particles upwardly through said screens;
 first and second discs connected to said shaft for rotation therewith, said discs being spaced from each other along said shaft and positioned between said screens and said outlets;
 first and second plates fixedly attached to said chamber in positions opposite said first and second discs respectively, said plates having circular apertures formed therein in which the discs are located, a circular space being formed between each of said plates and its associated disc, a vortex zone being formed in said circular space when said discs are rotated by said shaft;
 cyclonic classifier means for separating microparticles from gas in which they are carried;
 first and second centrifugal fans connected to said shaft for rotation therewith, said first fan being positioned between said first and second discs and opposite a first one of the outlets of said vessel to drive the comminuted particles and gas carrying said particles through said first one of said outlets to said cyclonic classifier means, said second fan being positioned between both of said discs and the other end of said chamber and opposite a second one of the outlets of the chamber to drive microparticles and gas through said second one of said outlets to said cyclonic classifier means; and
 means for recycling gas from said cyclonic classifier means back to said vessel, said recycling means including means for removing moisture from said gas.

8. The device of claim 7 wherein the drive shaft is rotated at a speed of 1,200–10,000 rpm.

9. The device of claim 7 wherein the mesh of the screens is 4–10 mesh.

10. The device of claim 7 wherein said means for removing moisture from said gas comprises a cooling coil in said recycling means for converting said moisture into liquid and means from removing said liquid from said recycling means.

11. A method for comminuting solid particles comprising the steps of:

feeding said particles in a gas stream into a vessel;
 driving said particles and said gas stream upwardly so that they are suspended in said vessel;
 comminuting said particles in a vortex zone formed in said vessel;
 feeding the comminuted particles to a cyclone to separate said particles from said gas stream;
 recycling the gas stream from said cyclone back to said vessel; and
 removing moisture from said gas stream during said recycling.

12. The method of claim 11 wherein the moisture is removed by cooling said gas stream to convert the moisture to liquid and separating out the liquid from the gas stream.

* * * * *